United States Patent
Lee et al.

(10) Patent No.: US 7,800,700 B2
(45) Date of Patent: Sep. 21, 2010

(54) VIDEO SCALERS HAVING REDUCED OUTPUT MEMORY AND METHODS FOR SELECTING OUTPUT MEMORY SIZE

(75) Inventors: Dong-Hoon Lee, Seoul (KR); Chang-Dae Park, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1210 days.

(21) Appl. No.: 11/392,653

(22) Filed: Mar. 30, 2006

(65) Prior Publication Data

US 2006/0262223 A1 Nov. 23, 2006

(30) Foreign Application Priority Data

May 23, 2005 (KR) .................. 10-2005-0043122

(51) Int. Cl.
*H04N 9/74* (2006.01)
*H04N 9/64* (2006.01)

(52) U.S. Cl. .................. 348/718; 348/581; 345/564; 345/660

(58) Field of Classification Search ............ 348/581, 348/441, 714, 716, 718; 345/660, 665–668, 345/534, 536, 560, 564, 574; 382/298–301; 358/1.2, 528, 451
See application file for complete search history.

(56) References Cited

U.S. PATENT DOCUMENTS

| | | | | | |
|---|---|---|---|---|---|
| 5,528,528 A | * | 6/1996 | Bui | .................. | 708/400 |
| 5,739,867 A | * | 4/1998 | Eglit | .................. | 348/581 |
| 6,266,095 B1 | * | 7/2001 | Sunwoo | .................. | 348/473 |
| 6,816,634 B2 | * | 11/2004 | Hirawa | .................. | 382/305 |
| 7,091,944 B2 | * | 8/2006 | Wang | .................. | 345/100 |
| 2003/0011609 A1 | * | 1/2003 | Deering et al. | .................. | 345/582 |
| 2003/0184678 A1 | * | 10/2003 | Chen et al. | .................. | 348/511 |
| 2005/0105001 A1 | * | 5/2005 | Yui et al. | .................. | 348/441 |
| 2005/0240745 A1 | * | 10/2005 | Iyer et al. | .................. | 711/167 |
| 2006/0232689 A1 | * | 10/2006 | Ito et al. | .................. | 348/241 |

FOREIGN PATENT DOCUMENTS

| | | |
|---|---|---|
| JP | 08-032941 | 2/1996 |
| JP | 2004-184738 | 7/2004 |
| KR | 10-2000-0046147 | 7/2000 |
| KR | 10-2001-0069146 | 7/2001 |
| KR | 10-2003-0060617 | 7/2003 |
| KR | 1020050012517 | 2/2005 |
| KR | 1020050022618 | 3/2005 |

* cited by examiner

*Primary Examiner*—Victor Kostak
(74) *Attorney, Agent, or Firm*—Harness, Dickey & Pierce, P.L.C.

(57) ABSTRACT

A video scaler may include a scaler core and an output memory having a reduced size. An image processing apparatus may include a video scaler with a scaler core and an output memory with a reduced size. The scaler core may scale input image data and store the scaled image data in the output memory. The image processing apparatus may read image data from the output memory a reduced storage time.

42 Claims, 7 Drawing Sheets

| SF | Horizontal Output Pixel Number | ST | RT | DIFF (ST-RT) | WT1 (128-Size) | WT2 (256-Size) | WT3 (512-Size) | WT1-DIFF | WT2-DIFF | WT3-DIFF |
|---|---|---|---|---|---|---|---|---|---|---|
| 1 | 1920 | 13.33333333 | 25.85858586 | -12.5253 | 0.888889 | 1.777778 | 3.555556 | 13.41414 | 14.30303 | 16.08081 |
| 2 | 960 | 13.33333333 | 12.92929293 | 0.40404 | 1.777778 | 3.555556 | 7.111111 | 1.373737 | 3.151515 | 6.707071 |
| 3 | 640 | 13.33333333 | 8.619528620 | 4.713805 | 2.666667 | 5.333333 | 10.66667 | -2.04714 | 0.619529 | 5.952862 |
| 4 | 480 | 13.33333333 | 6.464646465 | 6.868687 | 3.555556 | 7.111111 | 14.22222 | -3.31313 | 0.242424 | 7.353535 |
| 5 | 384 | 13.33333333 | 5.171717172 | 8.161616 | 4.444444 | 8.888889 | 17.77778 | -3.71717 | 0.727273 | 9.616162 |
| 6 | 320 | 13.33333333 | 4.309764310 | 9.023569 | 5.333333 | 10.66667 | 21.33333 | -3.69024 | 1.643098 | 12.30976 |
| 7 | 274.2857143 | 13.33333333 | 3.694083694 | 9.63925 | 6.222222 | 12.44444 | 24.88889 | -3.41703 | 2.805195 | 15.24964 |
| 8 | 240 | 13.33333333 | 3.232323232 | 10.10101 | 7.111111 | 14.22222 | 28.44444 | -2.9899 | 4.121212 | 18.34343 |
| 9 | 213.3333333 | 13.33333333 | 2.873176207 | 10.46016 | 8 | 16 | 32 | -2.46016 | 5.539843 | 21.53984 |
| 10 | 192 | 13.33333333 | 2.585858586 | 10.74747 | 8.888889 | 17.77778 | 35.55556 | -1.85859 | 7.030303 | 24.80808 |
| 11 | 174.5454545 | 13.33333333 | 2.350780533 | 10.98255 | 9.777778 | 19.55556 | 39.11111 | -1.20478 | 8.573003 | 28.12856 |
| 12 | 160 | 13.33333333 | 2.154882155 | 11.17845 | 10.66667 | 21.33333 | 42.66667 | -0.51178 | 10.15488 | 31.48822 |
| 13 | 147.6923077 | 13.33333333 | 1.989121989 | 11.34421 | 11.55556 | 23.11111 | 46.22222 | 0.211344 | 11.7669 | 34.87801 |
| 14 | 137.1428571 | 13.33333333 | 1.847041847 | 11.48629 | 12.44444 | 24.88889 | 49.77778 | 0.958153 | 13.4026 | 38.29149 |
| 15 | 128 | 13.33333333 | 1.723905724 | 11.60943 | 13.33333 | 26.66667 | 53.33333 | 1.723906 | 15.05724 | 41.72391 |
| 16 | 120 | 13.33333333 | 1.616161616 | 11.71717 | 14.22222 | 28.44444 | 56.88889 | 2.505051 | 16.72727 | 45.17172 |

VIDEO SCALERS HAVING REDUCED OUTPUT MEMORY AND METHODS FOR SELECTING OUTPUT MEMORY SIZE

PRIORITY STATEMENT

This non-provisional U.S. patent application claims priority under 35 U.S.C. §119 of Korean Patent Application 10-2005-0043122 filed on May 23, 2005, the entire contents of which are incorporated herein by reference.

BACKGROUND

1. Field of the Invention

Example embodiments of the present invention are directed to video scaling for transforming input images into output images having suitable dimensions. At least one example embodiment of the present invention provides a video scaler with an output memory and a method for reducing the size of the output memory for the video scaler.

2. Discussion of the Related Art

Various related art digital imaging apparatuses may be used to normalize digital images. For example, digital televisions, high definition (HD) televisions, personal digital assistants (PDAs), International Mobile Telecommunications 2000 (IMT-2000) terminals, etc., may utilize processes such as picture segmentation, magnification, reduction and/or smoothing. These processes may provide distinct images incapable of being shown by analogue imaging technique.

Image-scaling techniques have been used in applications for images received through cameras, for partial image magnification and picture-in-picture by digital image output apparatuses. With generalization of colors and motion pictures in mobile communication terminals, image-scaling techniques may be increasingly important factors in interfacing between standard video Coder/Decoders (CODECs) and Liquid Crystal Display (LCD) units.

For example, a CODEC may be designed for Quadrature Common Interface Format (QCIF) of 176*144, where 176 represents the horizontal pixel number, and 144 represents the vertical pixel number. The combination 176*144 may define the total size of the image. In another example, LCD units of terminal apparatuses may be manufactured with various screen sizes corresponding to dimensions and unit costs. In these related art examples, images output from a video CODEC may need to be enlarged or scaled down so that the images may be displayed on a screen of the LCD unit.

A related art video scaler may perform a scaling operation using a clock signal having a frequency higher than that of an output clock signal. An output terminal of the video scaler may be coupled with an output buffer or memory to deal with asynchronization between image data output from the video scaler and image data transferred to an output terminal of the image processing chip (e.g., a terminal coupled to a display unit such an LCD panel). Size of the output memory may be defined by 'the maximum horizontal pixel number * image data size per pixel' for output image data.

In operational environments lacking sufficient system resources for digital image-processing functions, various kinds of digital image-processing functions may still be implemented because of sufficient power supplies and product volume (e.g., digital televisions, Digital Video Disc (DVD), etc.). However, portable systems, such as IMT-2000 mobile communication terminals, PDAs, digital camcorders, etc., may be limited with respect to product volume, power supply capacity, etc. Therefore, implementing digital image-processing functions on these systems may be more difficult.

SUMMARY OF THE INVENTION

At least some example embodiments of the present invention provide video scalers with reduced output memory size that may operate more stably and/or generate sync signals for more stable operation. At least some example embodiments of the present invention are directed to methods for selecting a size of an output memory so as to reduce the output-memory of a video scaler.

According to an example embodiment of the present invention, a video scaler may include a scaler core that may perform a scaling operation for input image signal. The video scaler may also include an output memory for storing an image signal output from the scaler core. The size of the output memory may correspond to a writing time (WT). The writing time (WT) may be a time for filling the output memory with data, and may have a value larger than a difference between a scaling time (ST) for scaling image signals for horizontal input pixels in the scaler core and a reading time (RT) for reading out image signals of horizontal output pixels from the output memory.

According to another example embodiment of the present invention, an image processing apparatus may include a system bus and a video scaler connected to the system bus. The video scaler may perform a scaling operation on an input image signal. The video scaler may include a scaler core for performing the scaling operation and outputting a scaled image signal and an output memory for storing an image signal output from the scaler core. The output memory may have a size based on a writing time (WT). The writing time (WT) may be a writing time for filling the output memory with data and may be selected to have a value (e.g., minimum value) larger than a difference between a scaling time (ST) for scaling image signals associated with horizontal input pixels in the scaler core and a reading time (RT) for reading out image signals associated with horizontal output pixels from the output memory.

According to yet another example embodiment of the present invention, writing times for filling a plurality of memories with scaled image data may be evaluated. The plurality of memories may have different sizes. A memory with minimum writing times longer than a difference between a scaling time (ST) for scaling image signals for horizontal input pixels in the scaler core and a reading time (RT) for reading out image signals of horizontal output pixels from the output memory may be selected as the output memory.

In at least some example embodiments of the present invention, the horizontal input pixels may be pixels included in a horizontal line of an input image and the horizontal output pixels may be pixels included in a horizontal line of an output image. The scaling time may be obtained based on the horizontal pixel number and scaling clock frequency (e.g., horizontal input pixel number/scaling clock frequency). The reading time may be obtained based on horizontal output pixel number and output clock frequency (e.g., horizontal output pixel number/output clock frequency). The scaling clock frequency may be higher than the output clock frequency and the output memory may be sized based on the maximum-storing pixel number and an image data size for each pixel (e.g., the maximum-storing pixel number * image data size for each pixel). The scaler core may perform the scaling operation in response to a horizontal sync signal and may provide the scaled image signal to the output memory in response to an output sync signal.

In at least some example embodiments of the present invention, the scaling core may perform the scaling operation for the input image signal in accordance with a scaling factor (SF) determined based on the horizontal input pixel number and the horizontal output pixel number (e.g., the horizontal input pixel number/the horizontal output pixel number).

In at least some example embodiments of the present invention, the writing and reading times may be obtained based on a scaling factors associated with a plurality of memories, the plurality of memories having different sizes. Each output memory may be selected from among the plurality of memories such that the writing time has a value (e.g., a minimum value) longer than the difference between the scaling time and the reading time.

In at least some example embodiments of the present invention, scaling times may be obtained for a plurality of scaling factors. Writing and reading times may be obtained corresponding to scaling factors for a plurality of memories with different sizes. The output memory may be selected from among the plurality of memories such that the writing time has a value (e.g., a minimum value) where a value of the writing time–the scaling time–the reading time is larger than 0 and accordance with the scaling factor. The scaler core may perform the scaling operation in response to a horizontal sync signal and may transfer the scaled image signal to the output memory in response to an output sync signal.

In at least some example embodiment of the present invention, the image processing apparatus may further include a clock/sync signal generator for generating the horizontal sync signal and the output sync signal. The output sync signal may be activated, for example, after an output offset has lapsed, the output offset beginning after activation of the horizontal sync signal. The clock/sync signal generator may include a register for storing a value of the output offset and an arithmetic unit for evaluating the output offset with reference to the scaling factor, the scaling time, the reading time, the scaling clock frequency and the output clock frequency. The arithmetic unit may also store a value of the output offset into the register.

In at least some example embodiments of the present invention, the arithmetic unit may evaluate the output offset based on the scaling time, the reading time and the output clock frequency (e.g., (the scaling time–the reading time)* (the output clock frequency) when the scaling factor is larger than 1 and the scaling time is longer than the reading time. The arithmetic unit may evaluate the output offset with a minimum value if there is no conflict between reading and writing addresses, for example, when the scaling factor is larger than 1 and the scaling time is shorter than or equal to the reading time. The arithmetic unit may evaluate the output offset with a minimum value if there is no conflict between the reading and writing addresses, for example, when the scaling factor is smaller than 1.

In at least some example embodiments of the present invention, the writing times may be calculated for each of the plurality of memories according to a plurality of scaling factors. Each scaling factor may be determined based on a horizontal input pixel number and a horizontal output pixel number (e.g., horizontal input pixel number/horizontal output pixel number].

In at least some example embodiments of the present invention, the output offset may be set after the output memory has been established. The output offset may be set by evaluating the output offset with reference to the scaling factor, the scaling time, the reading time, the scaling clock frequency and the output clock frequency. For example, the output offset may be set based on (the scaling time–the reading time)*(the output clock frequency) when the scaling factor is larger than 1 and the scaling time is longer than the reading time. The output offset may be set by evaluating the output offset with the minimum value if there is no conflict between reading and writing addresses, the scaling factor is larger than 1 and the scaling time is less than or equal to the reading time. The output offset may be set by evaluating the output offset with the minimum value if there is no conflict between the reading and writing addresses and the scaling factor is smaller than 1.

BRIEF DESCRIPTION OF THE FIGURES

The present invention will become more apparent by describing in detail example embodiments thereof with reference to the attached drawings in which:

FIG. 3 is a table chart summarizing scaling times for various scaling factors, and reading and writing times of memories with various sizes in order to select a size of an output memory according to an example embodiment of the present invention;

DETAILED DESCRIPTION OF EXAMPLE EMBODIMENTS OF THE PRESENT INVENTION

Various example embodiments of the present invention will now be described more fully with reference to the accompanying drawings in which some example embodiments of the invention are shown. In the drawings, the thicknesses of layers and regions are exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
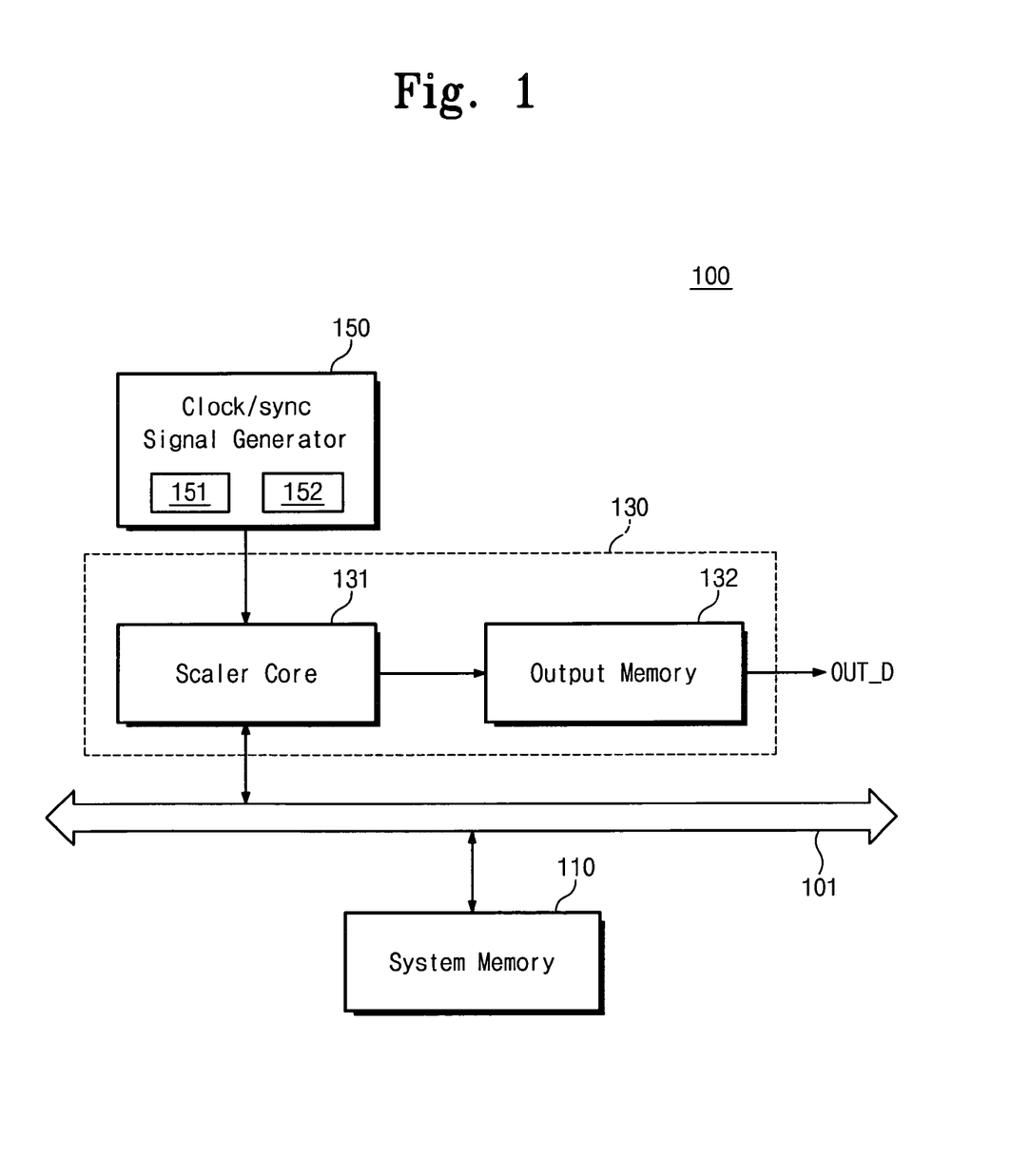
FIG. 1 is a block diagram illustrating a functional architecture of an image processing apparatus according to an example embodiment of the present invention.

FIG. 1 is a block diagram illustrating an image processing apparatus according to an example embodiment of the present invention. The image processing apparatus (or image processing chip, for example) 100 may include a system memory 110 and/or a video scaler 130. The video scaler 130 may be connected to a system bus 101. In at least one example embodiment, the image processing apparatus 100 may be implemented in the form of System-On-Chip (SOC). The SOC may further include a clock/sync signal generator 150 for supplying clock and sync signals for operating the video scaler 130. The clock/sync signal generator 150 may include an arithmetic unit 151 and/or an offset register 152. The arithmetic unit 151 and the offset register 152 will be described in more detail below.

While the image processing apparatus 100 may also be associated with a main processor such as a Moving Picture Experts Group (MPEG) circuit, an audio circuit, a graphic controller, a de-interlacer or the like, detailed descriptions of these will be omitted for the sake of brevity.

Input image data transferred from a host may be stored in the system memory 110. In this example, the host may be a computer, an image input device such a camera, a digital broadcasting station or the like.

A scaler core 131 may retrieve input image data from the system memory 110 and may perform one or more scaling operations (e.g., scaling-up/down operations) to increase or decrease the number of pixels on the input image in accordance with a scaling ratio. For example, the scaler core 131 may scale-down the input image data by performing a down-sampling operation on the input image data, or may scale-up the input image data to increase the number of pixels by reproducing the pixels of the input image data, interpolating, etc. However, any suitable scaling operation may be used to scale input image data up or down.

The scaler core 131 may perform the scaling operations, according to scaling factors and in response to clock and sync signals provided from the clock/sync signal generator 150. The scaling factors may be provided from a main processor (not shown), or obtained using Equation 1 with the numbers of input and output pixels taken from the main processor.

$$\text{Scaling Factor}(SF) = \frac{\text{Input pixel number}}{\text{Output pixel number}} \quad [\text{Equation 1}]$$

If the scaling factor SF is less than 1, the scaling-up operation may be enabled. If the scaling factor SF is greater than 1, the scaling-down operation may be enabled. The scaler core 131 may perform vertical and horizontal scaling operations using vertical and horizontal scalers (not shown), respectively. After performing the scaling operation using the vertical scaler, the horizontal scaling operation may be performed using the horizontal scaler.

The scaler core 131 may store the scaled image data in an output memory, and may transfer the image data from the output memory 132 to an output terminal. The output memory 132 according to an example embodiment of the present invention may be designed to have a reduced size sufficient to assure normal operation. For example, the output memory 132 may have a minimum size sufficient to ensure normal operation.

Figure 2:
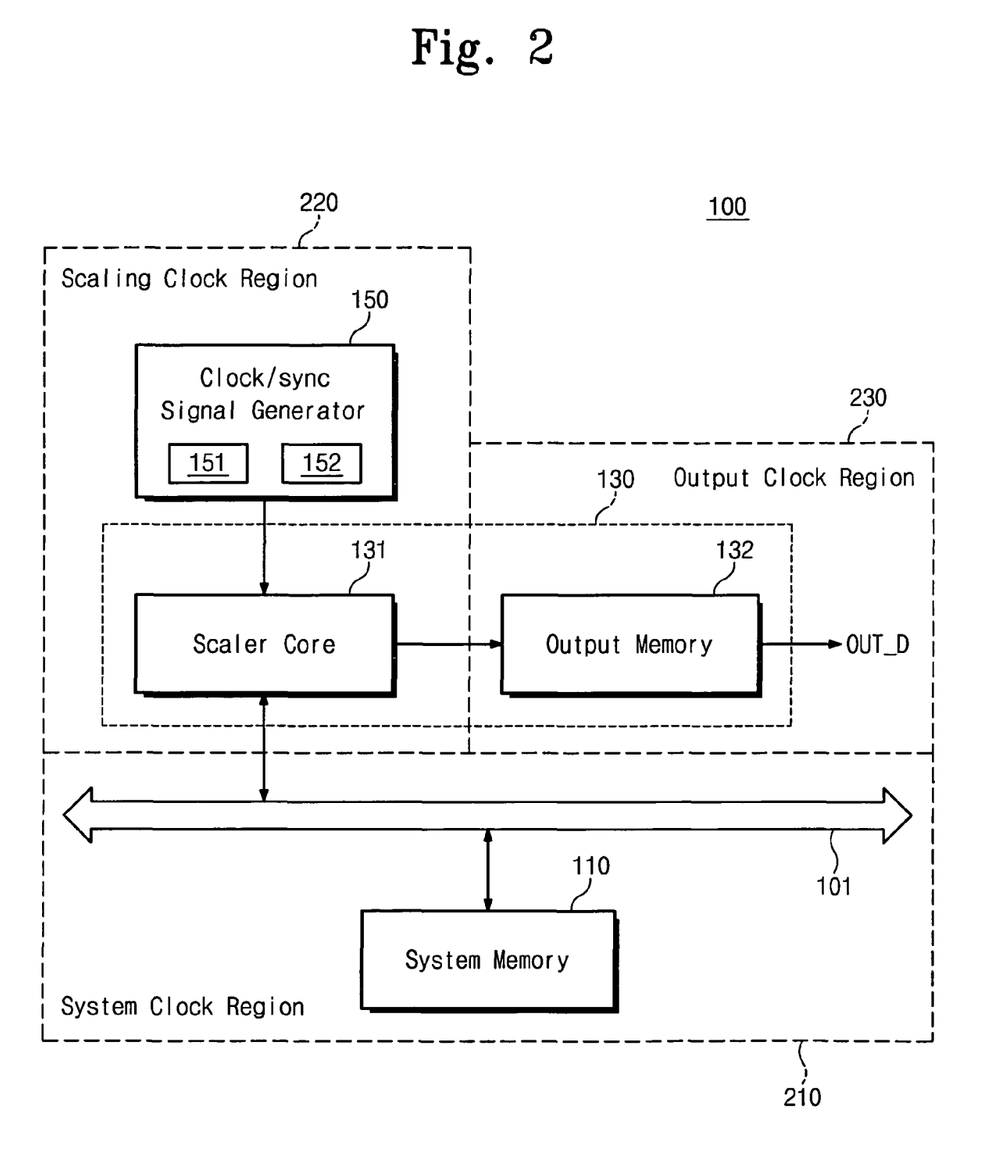
FIG. 2 is a block diagram illustrating a regional configuration classified by frequencies of clock signals according to an example embodiment of the present invention.

FIG. 2 is a block diagram illustrating a regional configuration classified by frequencies of clock signals. The system bus 101 and the system memory 110 may operate in synchronization with a system clock signal. The clock/sync signal generator 150 and the scaler core 131 may operate in sync with a scaling-core clock signal. The output memory 132 may operate in sync with an output clock signal.

The frequency of the scaling-core clock signal may be higher than the output clock signal. In at least one example embodiment of the present invention, if the resolution of image is 1920*540; the input image signal may be applied in the form of a 1080i signal (where 'i' represents interlace); a frequency of the scaling-core clock signal may be 144 MHz; and a frequency of the output clock signal may be 74.25 MHz.

FIG. 3 is a table showing scaling times for various scaling factors and reading and writing times of memories with various sizes. The numerical values arranged in the table of FIG. 3 are shown for example purposes only and should not limit the scope of the present invention. In FIG. 3, the number of horizontal pixels ranges from 1920 to 120 for scaling factors ranging from 1 to 16.

The scaling time ST is defined as the time for performing scaling operation of one line of horizontal input pixels. The scaling time ST may be determined by 'horizontal input pixel number/scaling clock signal frequency', for example, 1920/144 MHz=12.33333333 µs.

The reading time RT is defined as the time to read one line of horizontal output pixels in the output memory 132. The scaler core 131 may transfer a read command and address to the output memory 132 in response to an output clock signal supplied from the clock/sync signal generator 150. The reading time RT may be determined by 'horizontal output pixel number/output clock signal frequency'. For example, when the number of the horizontal output pixels (e.g., horizontal output pixel number) is 1920, the reading time RT may be 1920/74.25 MHz=23.85858586 μs. When the horizontal output pixel number is 960, the reading time RT may be 960/74.25 MHz=12.92929293 μs.

Writing times, WT1, WT2 and WT3 in FIG. 3 are example writing times for memories having sizes 128, 256 and 512 pixels, respectively. The 128-pixel memory may be capable of storing image data corresponding to 128 pixels, and the associated writing time WT1 represents a time for storing image data in the 128-pixel memory to maximum capacity. Referring back to FIG. 1, in at least one example embodiment of the present invention, the output memory 132 may be supplied with a writing command, a writing address and image data. The writing command and address may be supplied from the scaler core 131, or the other circuit blocks in the video scaler 130, to the output memory 132. The image data output from the scaler core 131 may be transferred to the output memory 132 in synchronization with a scaling-core clock signal. For example, if the scaling factor SF is 4, image data scaled-up or down may be output from the scaler core 131 every four cycles of the scaling-core clock signal, and the writing time WT1 may be determined by '(memory size/scaling-core clock frequency)*SF'.

The writing time WT for completely filling the output memory 132 may be longer than a difference between the scaling time ST, for scaling image signals of horizontal input pixels by the scaler core 131, and the reading time RT, for reading out image signals of horizontal output pixels from the output memory 132, (e.g., WT>ST−RT). Beginning a reading operation before storing the scaled image data into the output memory 132 may cause vacancy in the output memory 132. A reading operation may be enabled even when there is no data in the output memory 132. The condition WT>ST−RT may be rearranged to RT+WT>ST to suppress (e.g., prevent) such vacancy in the output memory 132.

Figure 4:
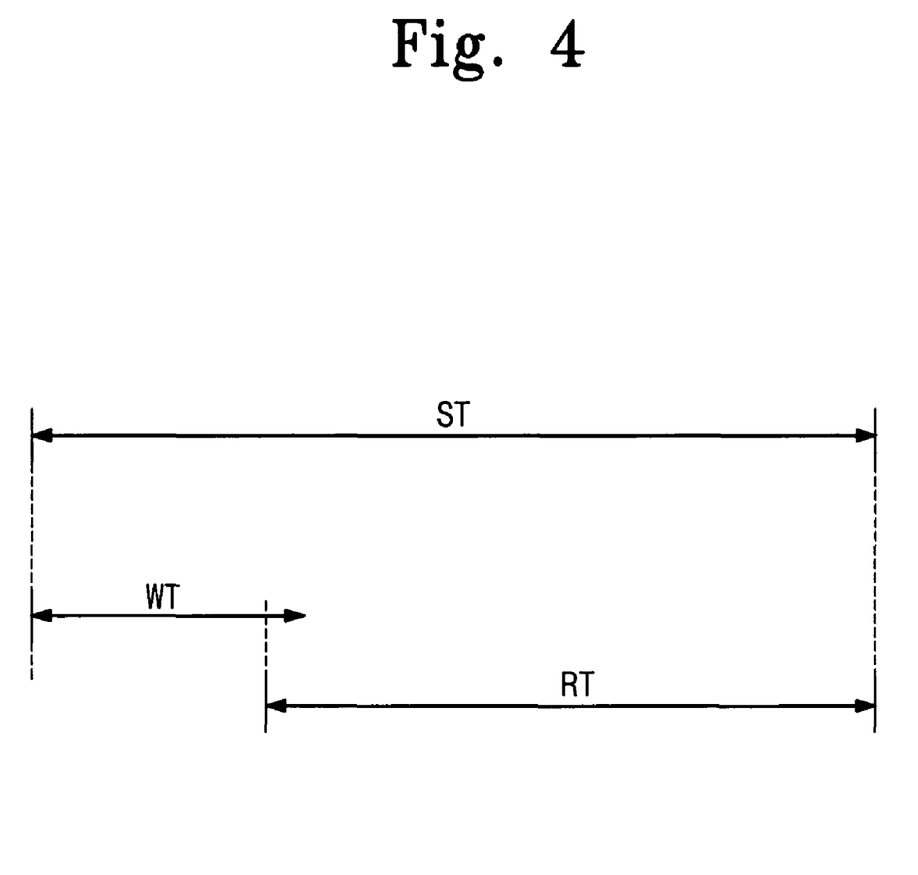
FIG. 4 is a schematic diagram illustrating relations among the scaling time, the reading time, and the writing time.

FIG. 4 schematically illustrates relations among the scaling time ST, the reading time RT and the writing time WT. When WT>ST−RT, a size (or volume) of the output memory 132 may be selected to have a value (e.g., a minimum value) of WT−(ST−RT). Reducing and/or minimizing the size of the output memory 132 may further reduce the circuit area of the video scaler 130.

Referring back to the examples shown in FIG. 3, the 128-pixel memory may not be sufficient for the output memory 132 because WT1 may be less than ST−RT (WT1<ST−RT) when the scaling factor SF ranges from 3 to 12. In this case, the 256-pixel memory may be used such that WT2<ST−RT for all values of the scaling factor. In another example, the 512-pixel memory may be used such that WT3<ST−RT for all values of the scaling factor SF. The memory-size may be selected such that at least normal operation in the video scaler 130 is assured, or such that the output memory 132 has a minimum size sufficient to facilitate normal operation.

If input image data is 4:2:2 while an output image data is set on 4:4:4 (in YCrCb format), the size of the output memory 132 for CrCb components may be set twice that for Y component. But, if the output memory 132 is sized according to example embodiments of the present invention, all or substantially all types of input image data formats may be scaled (e.g., 4:2:0, 4:2:2 and 4:4:4) into the 4:4:4 format without an additional memory.

Figure 5:
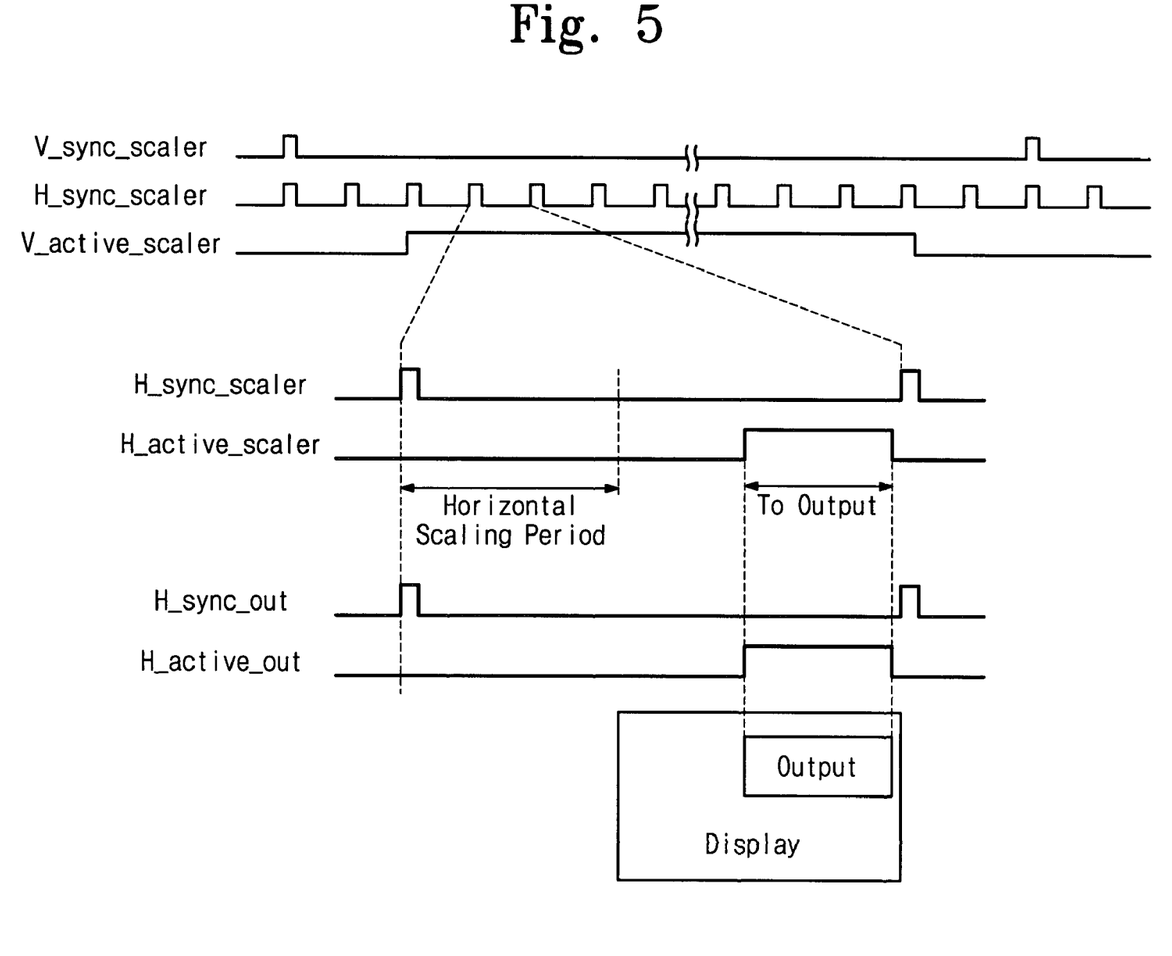
FIG. 5 is a timing diagram illustrating operations of sync signals provided from a clock/sync signal generator shown in FIG. 1.

FIG. 5 is a timing diagram illustrating operations of sync signals provided from the clock/sync signal generator 150 shown in FIG. 1. The clock/sync signal generator 150 may output a vertical sync signal V_sync_scaler, a vertical-scaling active signal V_active_scaler, a horizontal-output sync signal H_sync_out and/or a horizontal-output active signal H_active_out. While this example embodiment describes and depicts the signals generated from the clock/sync signal generator 150 as being provided to the video scaler 130, the horizontal-output sync signal H_sync_out and the horizontal-output active signal H_active_out may be applied to an output circuit (not shown). The output circuit may be embedded in the image processing apparatus 100, and may control image data output from the output memory 132 to a display panel through an output terminal in synchronization with the horizontal-output sync signal H_sync_out and the horizontal-output active signal H_active_out. In this example, the video scaler 130 may perform the read-out operation of image data in response to the vertical sync signal V_sync_scaler, the vertical-scaling active signal V_active_scaler, the horizontal-output sync signal H_sync_out and the horizontal-output active signal H_active_out.

The vertical sync signal V_sync_scaler and/or the horizontal sync signal H_sync_scaler may be activated each frame. The scaler core 131 may perform the scaling-up/down operation while the vertical-scaling active signal V_active_scaler is being enabled after activation of the vertical sync signal V_sync_scaler. The scaler core 131 may begin the horizontal scaling operation when the horizontal sync signal H_sync_scaler and may scale horizontal input pixels up or down in response to a scaling clock signal (not shown). The frequency of the scaling clock signal may be higher than the output clock signal, and an ending point of the scaling operation may vary in accordance with the frequency of the scaling clock signal. Image data scaled up or down through the scaler core 131 may be stored in the output memory 132. The image data stored in the output memory 132 may be read out during an activation period of a horizontal-scaling output-active signal H_active_scaler. The read-out image data may be output to the display panel through the output terminal during activation of the horizontal-output active signal H_active_out.

In one example, if the output memory 132 is sized to contain all or substantially all horizontal output pixels, an activation period of the horizontal-scaling output-active signal H_active_scaler may be positioned at the end of the horizontal sync signal H_sync_scaler, which may transfer image data to the display panel from the output memory 132 more safely.

If the output memory 132 is designed with a size capable of storing all or substantially all horizontal output pixels, (e.g., a minimum size at least capable of assuring a normal operation for the video scaler 131) the output memory 132 may incur a problem with operations of the video scaler 131 as shown in the timing diagram of FIG. 5. For example, if the output memory 132 is smaller than the horizontal output pixels in size, the image data may not be read out from the output memory 132 until the horizontal-scaling output-active signal H_active_scaler is enabled after storing the scaled data into the output memory 132. In this example, the output memory 132 may be able to store the next scaled data if it has a surplus space therein. Accordingly, if the output memory 132 is full of data, the scaler core 131 may be disabled for the scaling operation until there is space for storing data in the output memory 132. A scaling result, corresponding to the size of the output memory 132, may be transferred to the display panel without completing the scaling operation for horizontal input pixels. In these example cases, images shown by the display panel may result in abnormal pictures.

In example embodiments of the present invention, the clock/sync signal generator 150 may include the arithmetic unit 151 and/or the offset register 152 for regulating an interval from the activation of the horizontal sync signal H_sync_scaler to the activation of the horizontal-scaling output-active signal H_active_scaler (e.g., an offset time).

Figure 6:
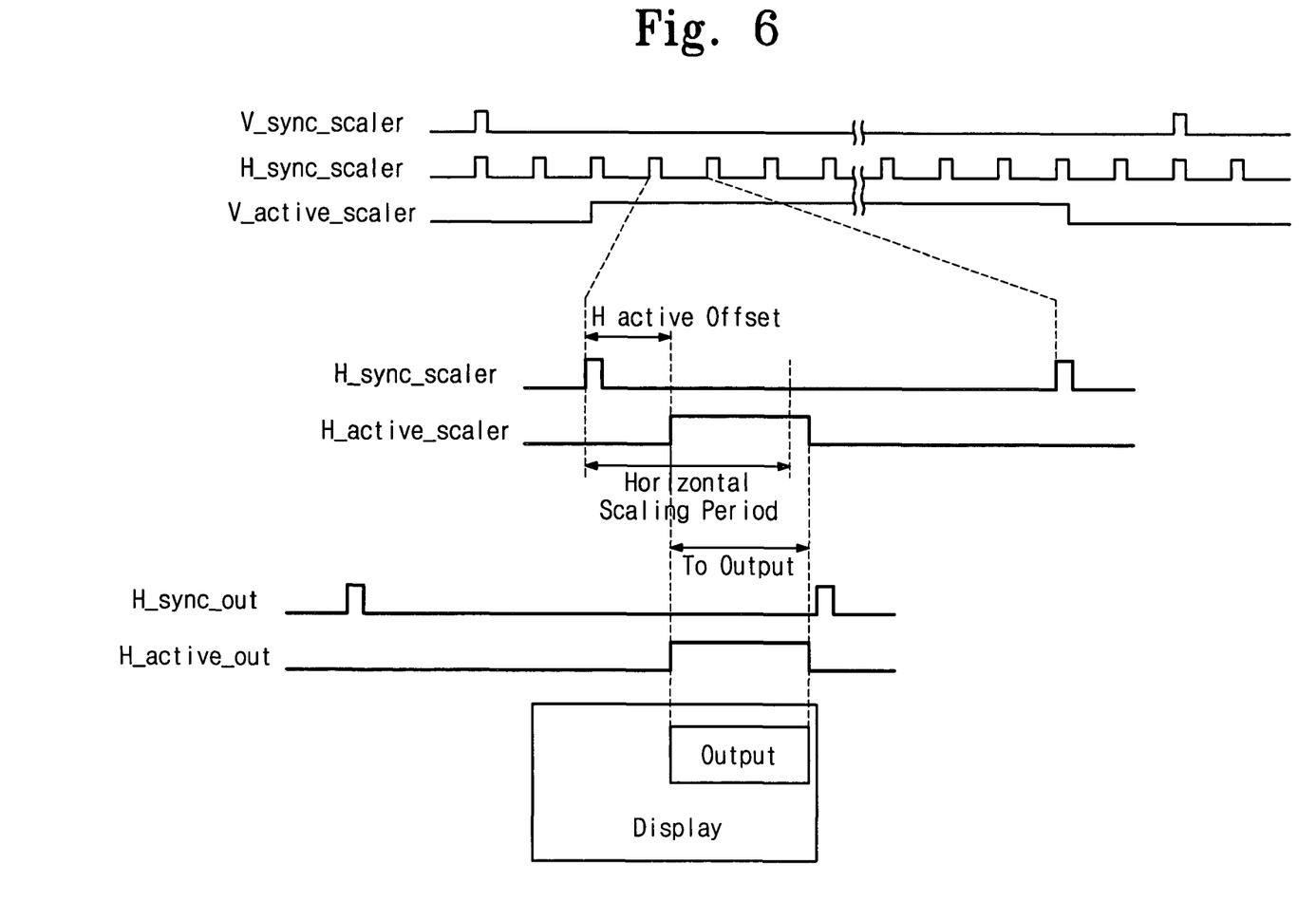
FIG. 6 is a timing diagram illustrating operational features of sync signals provided from a clock/sync signal generator shown in FIG. 1, according to an example embodiment of the present invention.

FIG. 6 is a timing diagram illustrating for the sync signals provided from the clock/sync signal generator 150 shown in FIG. 1, according to an example embodiment of the present invention. An algorithm for evaluating the offset time by the arithmetic unit 151 is shown below.

```
sf = input_h_size / output_h_size;
if (sf > 1) begin
    st = input_h_size / scale_clk;
    rt = output_h_size / out_clk;
    diff = st − rt
    if (diff <= 0)
        h_sync_offset = const_min;
    else
        h_sync_offset = diff * out_clk + const_delay;
end;
else begin
    h_sync_sync_offset =const_min;
end;
```

In the algorithm, sf represents the scaling factor SF; input_h_size represents the number of horizontal input pixels; output_h_size represents the number of horizontal output pixels; scale_clk represents a frequency of the scaling clock signal; out_clk represents a frequency of the output clock signal; const_min represents the minimum time constant; and const_delay represents a delay constant. In the algorithm, st represents the scaling time ST; rt represents the reading time RT; and diff represents a difference between the scaling time ST and the reading time RT. And, h_sync_offset denotes the output offset value to be obtained. The obtained output offset value may be stored in the offset register 512.

When the scaling factor SF is greater than 1, the scaler core 131 may perform the scaling-down operation. If the difference between the scaling time ST and the reading time RT, diff, is smaller than 0, the output offset value h_sync_offset may be determined to be the minimum time constant. The minimum time constant may correspond to a value (e.g., a minimum value) that is arranged to suppress and/or prevent a writing address from conflicting with a reading address for the output memory 132. If the difference between the scaling time ST and the reading time RT, diff, is larger than 0, the output offset value may be obtained by h_sync_offset=diff*out_clk+const_delay. The output offset value may be established such that the output memory 132 is not vacant.

If the scaling factor SG is less than 1, the scaler core 131 may conduct the scaling-up operation using interpolation. The scaling clock signal may have a frequency higher than that of the output clock signal, and the output offset value may be set on the minimum time constant const_min. Referring to the examples shown in FIG. 3, the 256-pixel memory may be selected as the minimum output memory size. If the difference between the scaling time ST and the reading time RT, diff, is less than 0 when the scaling factor SF is 1 or 2, the output offset value may be set on the minimum time constant const_min. When the scaling factor SF ranges from 3 to 16, inclusive, the output offset value may be evaluated by h_sync_offset=diff*74.25 MHz+const_delay.

The clock/sync signal generator 150 may output the horizontal-scaling output-active signal H_active_scaler with reference to the output offset value stored in the offset register 152.

According to this example manner for establishing the output offset value, time necessary for reading out image data from the output memory 132 may be reduced (e.g., minimized) because the scaled image data has been stored in the output memory 132 by the scaler core 131.

For example, with regard to the example values shown in FIG. 3, if the scaling factor SF is 3 and the output memory 132 is a 256-pixel memory, the output offset value may be obtained by h_sync_offset=4.713805*74.25 MHz+const_delay.

Figure 7:
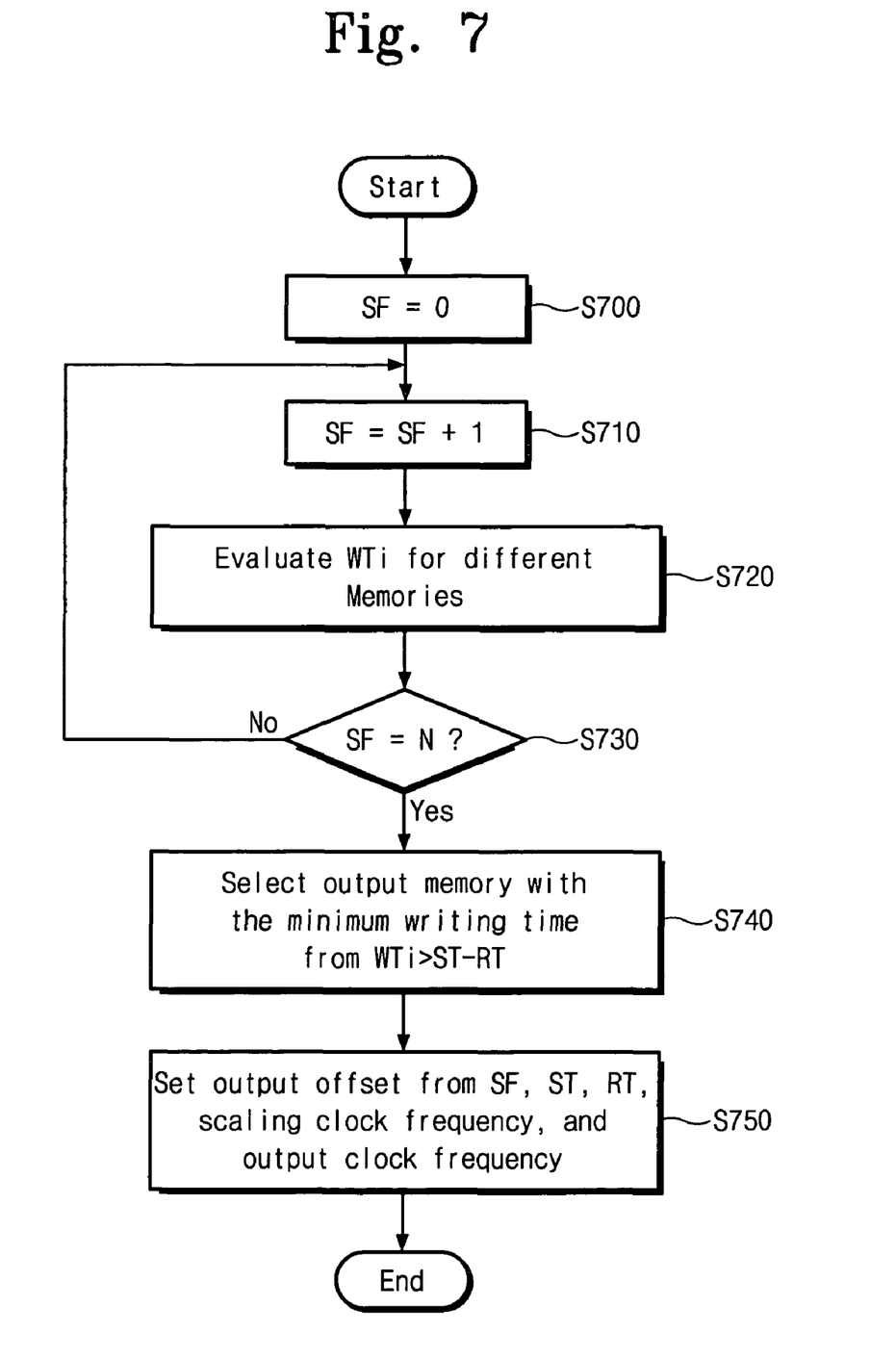
FIG. 7 is a flow chart showing a sequential procedure for selecting a size of the output memory and establishing an output offset value according to an example embodiment of the present invention.

FIG. 7 is a flow chart showing a method for selecting an output memory size according to an example embodiment of the present invention. At S700, an initial value of the scaling factor SF may be determined. In at least one example embodiment, the initial value of the scaling factor SF may be 0. At S710, a new value for the scaling factor SF may be generated by incrementing the scaling factor SF by 1. As shown in FIG. 3, as the writing time WT for the output memory 132 is being determined while gradually increasing the scaling factor SF from 1 to 16, the scaling factor SF may increase incrementally (e.g., SF=SF+1.

At S720, writing times WTi for memories with different pixel sizes may be evaluated for the current scaling factor SF. Referring to the examples shown in FIG. 3, three types of the memories such as the 128-pixel memory, the 256-pixel memory and the 512-pixel memory may be evaluated. When the horizontal input pixel number is 1920, the scaling clock frequency is 144 MHz and the output clock frequency 75.25 MHz, the scaling time ST, the reading time RT and the difference between the scaling time ST and the reading time RT may be determined. After determining writing times, WT1, WT2 and WT3 associated with the 128-pixel memory, the 256-pixel memory and the 512-pixel memory, respectively, the method may proceed to S730.

At S730, the scaling factor SF may be compared with a threshold value N (e.g., a maximum value). If the scaling factor SF is less than the threshold value N, the procedure may return to S710. If the scaling factor SF is equal to the threshold value N, the method may proceed to S740.

At S740, one of the memories with 128, 256, and 512 pixels may be selected as the output memory 132. In at least one example embodiment, the writing times for the scaling factors may be longer than the respective differences between their scaling times ST and the reading times RT, and the memory with the minimum writing time may be selected as the output memory 132.

At S750, the output offset value may be set based on the scaling factor SF, the scaling time ST, the reading time RT, the scaling clock frequency and the output clock frequency. The arithmetic operation for establishing the output offset value may be carried out through the algorithm described above.

According to example embodiments of the present invention, an output memory may be designed to have a reduced or minimum size, while still ensuring at least normal operation in the video scaler core. Example embodiments of the present invention may enable control image data to be read out from the output memory after reduced time requirement because the scaler core may store scaled image data in the output memory, which may offer the same or substantially the same performance as when the output memory is sized in accordance with the number of horizontal output pixels.

While example embodiments of the present invention have been described, it will be understood by those skilled in the art that various other modifications may be made, and equivalents may be substituted, without departing from the true scope of the present invention. Additionally, many modifications may be made to adapt a particular situation to the teachings of the present invention without departing from the present invention. The example embodiments described herein are not intended to limit the present invention, but such that the present invention includes all example embodiments falling within the scope of the appended claims.

What is claimed is:

1. A video scaler comprising:
   a scaler core configured to scale an input image signal; and
   an output memory configured to store the scaled image signal output from the scaler core, the output memory having a size such that a writing time for storing the output memory to capacity with data has a minimum value, the minimum value of the writing time being larger than a difference between a scaling time for scaling image signals of horizontal input pixels in the scaler core and a reading time for reading out scaled image signals of horizontal output pixels from the output memory.

2. The video scaler as set forth in claim 1, wherein the horizontal input pixels are pixels included in a horizontal line of the input image.

3. The video scaler as set forth in claim 1, wherein the horizontal output pixels are pixels included in a horizontal line of the output image.

4. The video scaler as set forth in claim 1, wherein the scaling time is determined based on a horizontal input pixel number and a scaling clock frequency.

5. The video scaler as set forth in claim 1, wherein the reading time is determined based on a horizontal output pixel number and an output clock frequency.

6. The video scaler as set forth in claim 3, wherein the scaling clock frequency is higher than the output clock frequency.

7. The video scaler as set forth in claim 1, wherein the size of the output memory is determined based on a maximum-storing pixel number and an image data size for each pixel.

8. The video scaler as set forth in claim 1, wherein the scaler core scales the input image signal in response to a horizontal sync signal and outputs the scaled image signal to the output memory in response to an output sync signal.

9. The video scaler as set forth in claim 1, wherein the scaler core scales the input image signal in accordance with a scaling factor, the scaling factor being based on the horizontal input pixel number and the horizontal output pixel number.

10. The video scaler as set forth in claim 1, wherein the writing and reading times are obtained based on scaling factors for a plurality of memories with different sizes.

11. An image processing apparatus comprising:
    a system bus; and
    the video scaler of claim 1 connected to the system bus.

12. The image processing apparatus as set forth in claim 11, wherein the horizontal input pixels are pixels included in a horizontal line of an input image and the horizontal output pixels are pixels included in a horizontal line of an output image.

13. The image processing apparatus as set forth in claim 11, wherein the scaling time is determined based on a horizontal input pixel number and a scaling clock frequency.

14. The image processing apparatus as set forth in claim 11, wherein the reading time is determined based on a horizontal output pixel number and an output clock frequency.

15. The image processing apparatus as set forth in claim 14, wherein the scaling clock frequency is higher than the output clock frequency.

16. The image processing apparatus as set forth in claim 11, wherein the size of the output memory is determined based on the maximum-storing pixel number and image data size for each pixel.

17. The image processing apparatus as set forth in claim 11, wherein the scaling core scales the input image signal in accordance with a scaling factor, the scaling factor being based on the horizontal input pixel number and the horizontal output pixel number.

18. The image processing apparatus as set forth in claim 17, wherein the scaling times are determined according to scaling factors, the writing and reading times are determined based on scaling factors for a plurality of memories having different sizes, wherein the output memory is selected from among the plurality of memories such that the writing time has a value and such that the difference between the writing time, the scaling time and the reading time (the writing time-the scaling time-the reading time) is larger than 0.

19. The image processing apparatus as set forth in claim 11, wherein the scaler core scales the input image signal in response to a horizontal sync signal and transfers the scaled image signal to the output memory in response to an output sync signal.

20. The image processing apparatus as set forth in claim 19, further including, a clock/sync signal generator for generating the horizontal sync signal and the output sync signal.

21. The image processing apparatus as set forth in claim 19, wherein the output sync signal is activated after an output offset has lapsed, the output offset beginning after the horizontal sync signal is activated.

22. The image processing apparatus as set forth in claim 21, the clock/sync signal generator further including, a register for storing a value of the output offset.

23. The image processing apparatus as set forth in claim 22, the clock/sync signal generator further including, an arithmetic unit for evaluating the output offset with reference to the scaling factor, the scaling time, the reading time, the scaling clock frequency and the output clock frequency and storing a value of the output offset into the register.

24. The image processing apparatus as set forth in claim 23, wherein the arithmetic unit evaluates the output offset based on the scaling time, the reading time and the output clock frequency when the scaling factor is larger than 1 and the scaling time is longer than the reading time.

25. The image processing apparatus as set forth in claim 23, wherein the arithmetic unit evaluates a minimum output offset value if there is no conflict between reading and writing addresses, the scaling factor is larger than 1 and the scaling time is less than or equal to the reading time.

26. The image processing apparatus as set forth in claim 23, wherein the arithmetic unit evaluates a minimum output offset value if there is no conflict between the reading and writing addresses and the scaling factor is less than 1.

27. A method comprising:
    evaluating writing times for filling a plurality of memories with scaled image data, at least some of the plurality of memories having different sizes; and
    selecting a memory from the plurality of memories as an output memory such that the selected memory has a minimum writing time that is greater than a difference between a scaling time (ST), for scaling image signals for horizontal input pixels in the scaler core, and a reading time (RT), for reading out image signals of horizontal output pixels from the output memory.

28. The method as set forth in claim 27, wherein the horizontal input pixels are pixels included in a horizontal line of an input image.

29. The method as set forth in claim 27, wherein the horizontal output pixels are pixels included in a horizontal line of an output image.

30. The method as set forth in claim 27, the evaluating the writing times further including, calculating writing times for each of the plurality of memories in accordance with at least one scaling factor, each scaling factor corresponding to a horizontal output pixel number, and being determined based on a horizontal input pixel number and horizontal output pixel number.

31. The method as set forth in claim 27, wherein the scaling time is determined based on the horizontal input pixel number and scaling clock frequency.

32. The method as set forth in claim 27, wherein the reading time is determined based on the horizontal output pixel number and the output clock frequency.

33. The method as set forth in claim 32, wherein the scaling clock frequency is higher than the output clock frequency.

34. The method as set forth in claim 27, wherein the size of each of the plurality of memories is determined based on a maximum-storing pixel number and image data size for each pixel.

35. The method as set forth in claim 27, wherein writing times for each memory in correspondence with each scaling factor are determined based on a maximum-storing pixel number, a scaling clock frequency and a scaling factor.

36. The method as set forth in claim 27, wherein a scaling operation is performed in response to a horizontal sync signal and an image signal is read from the output memory in response to an output sync signal.

37. The method as set forth in claim 36, wherein the output sync signal is activated after an output offset has lapsed, the output offset beginning after the horizontal sync signal is activated.

38. The method as set forth in claim 37, further including, setting the output offset after the output memory has been selected.

39. The method as set forth in claim 38, the setting of the output offset further including, evaluating the output offset with reference to the scaling factor, the scaling time, the reading time, the scaling clock frequency and the output clock frequency.

40. The method as set forth in claim 37, the setting of the output offset further including, evaluating the output offset based on the scaling time, the reading time and the output clock frequency when the scaling factor is larger than 1 and the scaling time is longer than the reading time.

41. The method as set forth in claim 37, the setting of the output offset further including, evaluating a minimum output offset if there is no conflict between reading and writing addresses, the scaling factor is larger than 1 and the scaling time is less than or equal to the reading time.

42. The method as set forth in claim 37, the setting of the output offset further including, evaluating a minimum output offset if there is no conflict between the reading and writing addresses and the scaling factor is less than 1.

* * * * *